(12) United States Patent
Thompson

(10) Patent No.: US 11,259,506 B2
(45) Date of Patent: Mar. 1, 2022

(54) BIRD MISTER APPARATUS

(71) Applicant: Robert Thompson, Henderson, NV (US)

(72) Inventor: Robert Thompson, Henderson, NV (US)

( * ) Notice: Subject to any disclaimer, the term of this patent is extended or adjusted under 35 U.S.C. 154(b) by 379 days.

(21) Appl. No.: 16/545,452

(22) Filed: Aug. 20, 2019

(65) Prior Publication Data

US 2021/0051924 A1 Feb. 25, 2021

(51) Int. Cl.
| | |
|---|---|
| *A01K 45/00* | (2006.01) |
| *B05B 15/62* | (2018.01) |
| *B05B 12/12* | (2006.01) |
| *B05B 9/04* | (2006.01) |
| *B05B 9/03* | (2006.01) |

(52) U.S. Cl.
CPC .............. *A01K 45/002* (2013.01); *B05B 9/03* (2013.01); *B05B 9/0403* (2013.01); *B05B 12/122* (2013.01); *B05B 15/62* (2018.02)

(58) Field of Classification Search
CPC .. A01K 45/002; B05B 9/0403; B05B 12/122; B05B 15/62
See application file for complete search history.

(56) References Cited

U.S. PATENT DOCUMENTS

| | | | |
|---|---|---|---|
| 5,493,996 A | 2/1996 | Verschuerer | |
| 5,540,186 A * | 7/1996 | Udelle | A01K 13/00 119/609 |
| 7,021,555 B2 | 4/2006 | Bagnall | |
| 11,089,764 B1 * | 8/2021 | Yeiser | A01K 39/04 |
| 2013/0264355 A1 * | 10/2013 | Jodoin | B65D 83/262 222/63 |
| 2014/0224893 A1 * | 8/2014 | Finch | B05B 15/62 239/1 |
| 2015/0367365 A1 | 12/2015 | Burks | |
| 2017/0112121 A1 * | 4/2017 | Ryan | B05B 15/68 |
| 2018/0153353 A1 * | 6/2018 | Takagi | A47K 5/1207 |
| 2018/0304288 A1 * | 10/2018 | Casper | B05B 9/043 |
| 2019/0054484 A1 * | 2/2019 | Weimin | A01K 27/001 |
| 2020/0029546 A1 * | 1/2020 | Aylward | A01M 1/2038 |
| 2020/0055311 A1 * | 2/2020 | Watanabe | B41J 2/04586 |

* cited by examiner

*Primary Examiner* — Ryan A Reis

(57) ABSTRACT

A bird mister apparatus for attracting and cooling birds includes a base plate, a housing, and a reservoir within a housing inside configured to hold liquid that can be sealed and unsealed. A spout has a spout aperture extending through to the housing inside. A pump is coupled within the housing inside and is in fluid communication with the spout aperture. An inlet tube is coupled to the pump and is in fluid communication with the pump. A CPU is coupled within the housing inside and is in operational communication with the pump. A battery is in operational communication with the CPU and the pump. A power switch is in operational communication with the CPU to activate and alternatively deactivate the pump. A hanger is coupled to the housing to support the apparatus on a tree branch, a fence, or an awning.

11 Claims, 6 Drawing Sheets

000# BIRD MISTER APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to bird watching accessories and more particularly pertains to a new bird watching accessory for attracting and cooling birds.

BRIEF SUMMARY OF THE INVENTION

An embodiment of the disclosure meets the needs presented above by generally comprising a base plate. A reservoir having a reservoir bottom side is coupled to a base plate top side. A cylindrical reservoir sidewall, and an open reservoir top side define a storage cavity configured to hold a liquid. A housing having a housing sidewall extending between a housing top side and a housing bottom side to define a housing inside is coupled to the reservoir. The housing bottom side and the housing sidewall are selectively engageable with the reservoir top side to seal and alternatively unseal the storage cavity. A spout is coupled to the housing top side and has a spout aperture extending from a spout top side through to the housing inside. A pump coupled within the housing inside and is in fluid communication with the spout aperture. An inlet tube is coupled to the pump. The inlet tube extends through a tube aperture of the housing bottom side to proximal the reservoir bottom side and is in fluid communication with the pump. A CPU is coupled within the housing inside and is in operational communication with the pump. A battery is coupled within the housing inside and is in operational communication with the CPU and the pump. A power switch is coupled to the housing sidewall. The power switch is in operational communication with the CPU to activate and alternatively deactivate the pump. A hanger is coupled to the housing and is configured to support the apparatus on a tree branch, a fence, or an awning.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
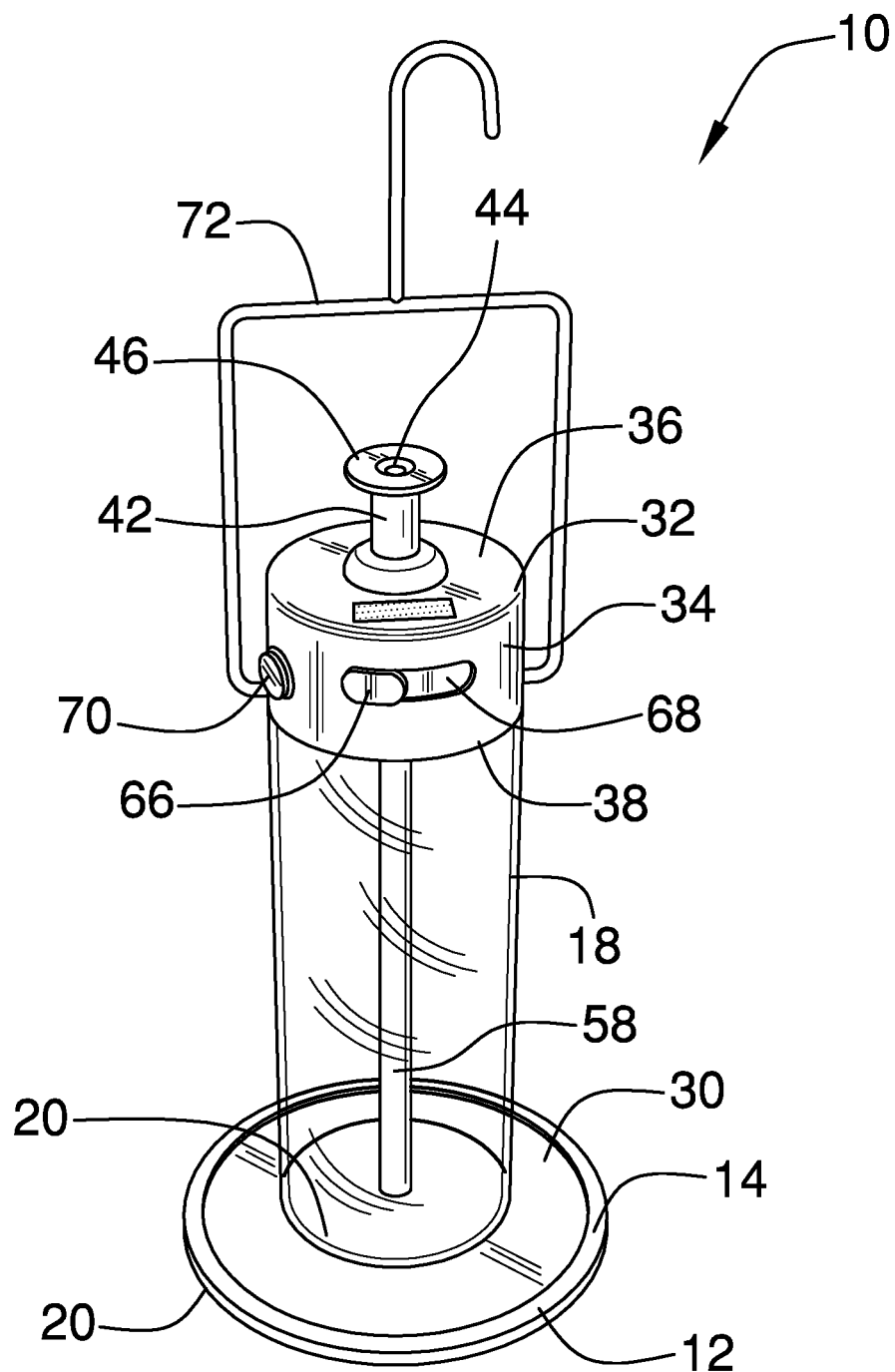
FIG. 1 is an isometric view of a bird mister apparatus according to an embodiment of the disclosure.
Figure 2:
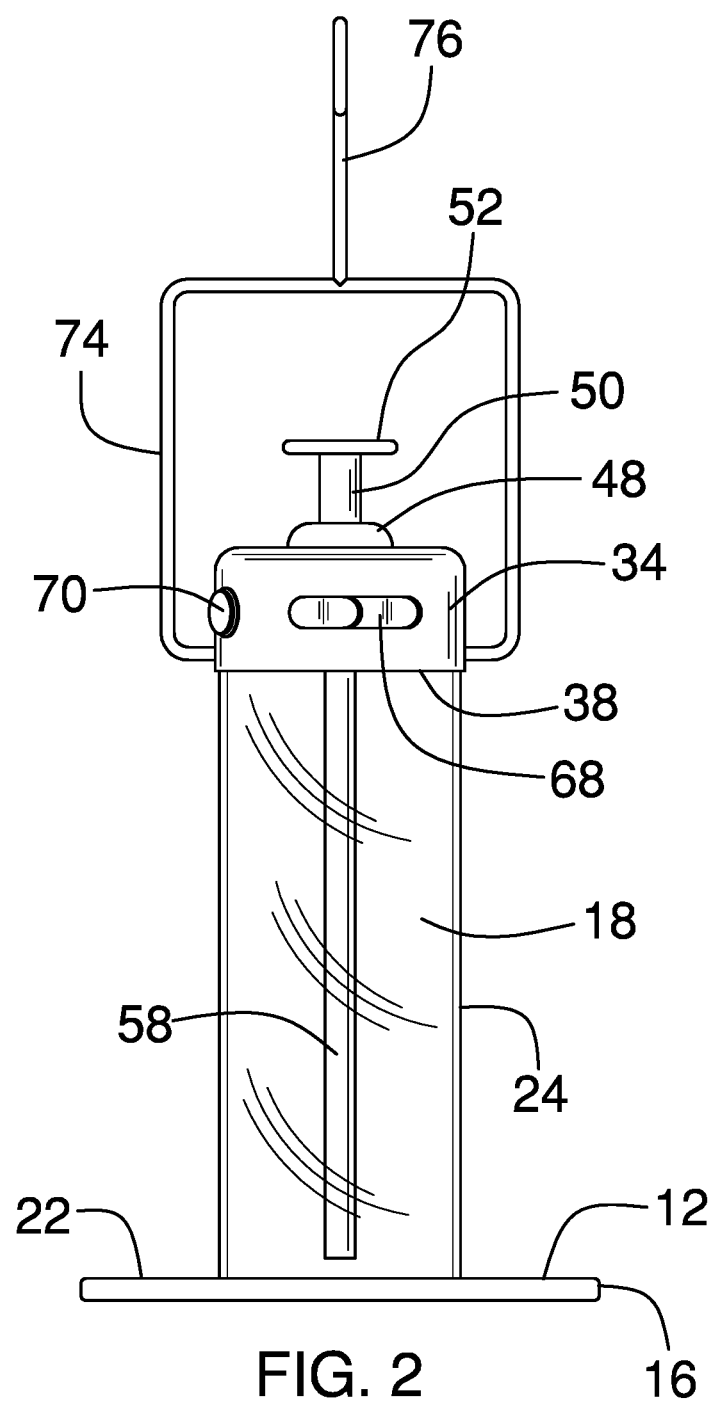
FIG. 2 is a front elevation view of an embodiment of the disclosure.
Figure 3:
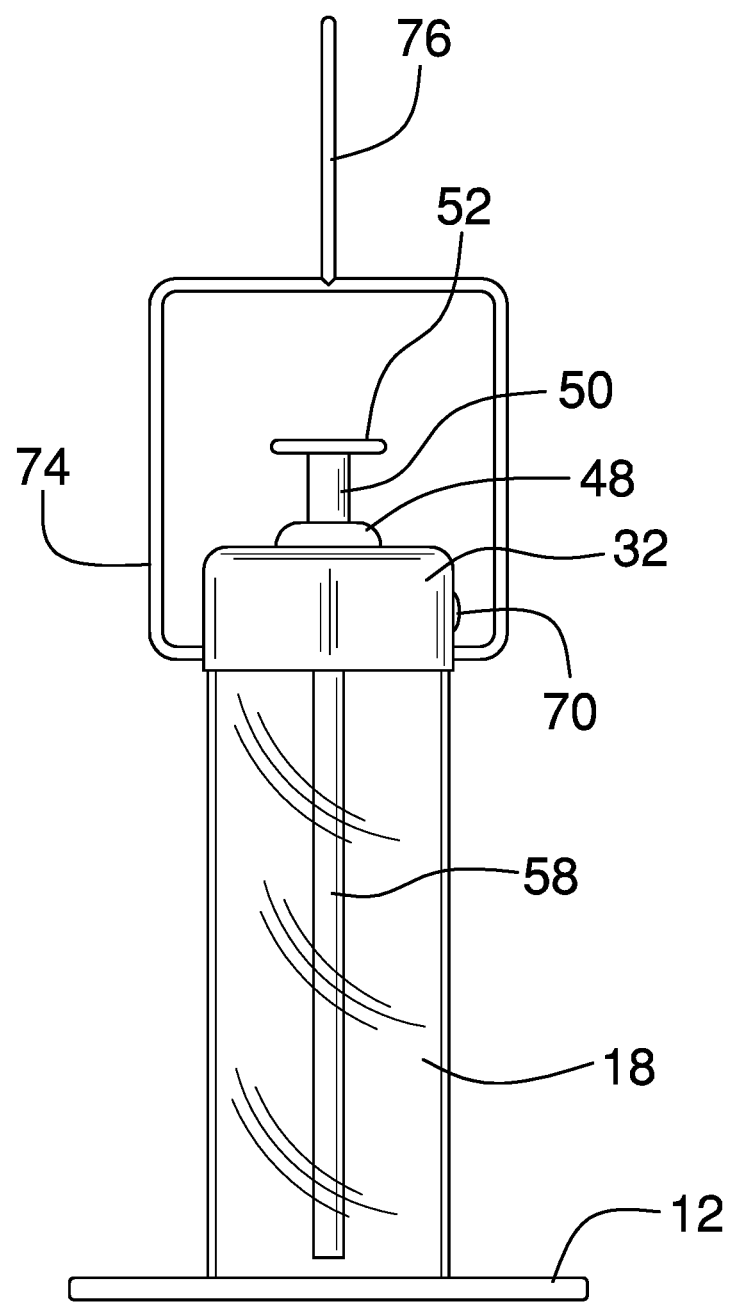
FIG. 3 is a rear elevation view of an embodiment of the disclosure.
Figure 4:
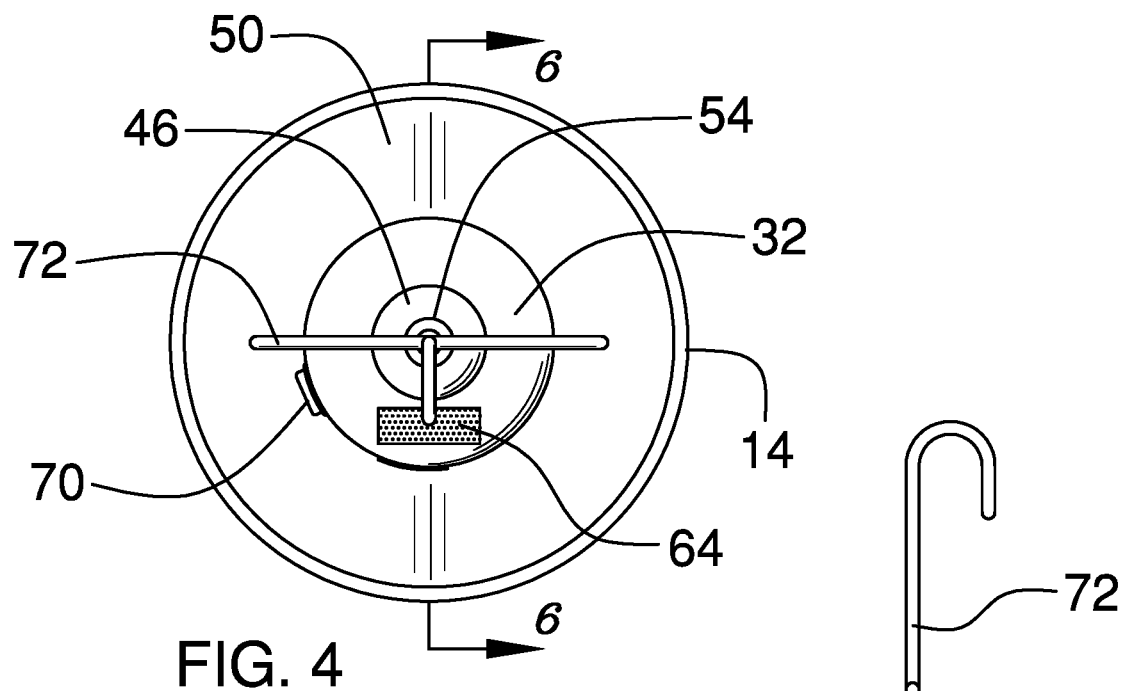
FIG. 4 is a top plan view of an embodiment of the disclosure.
Figure 5:
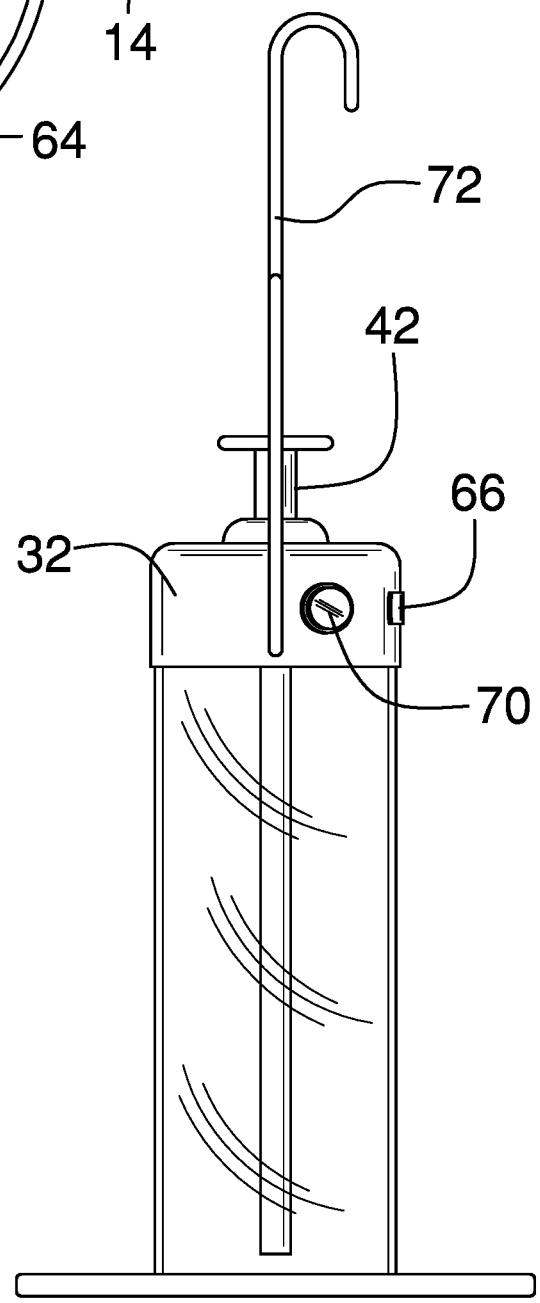
FIG. 5 is a side elevation view of an embodiment of the disclosure.
Figure 6:
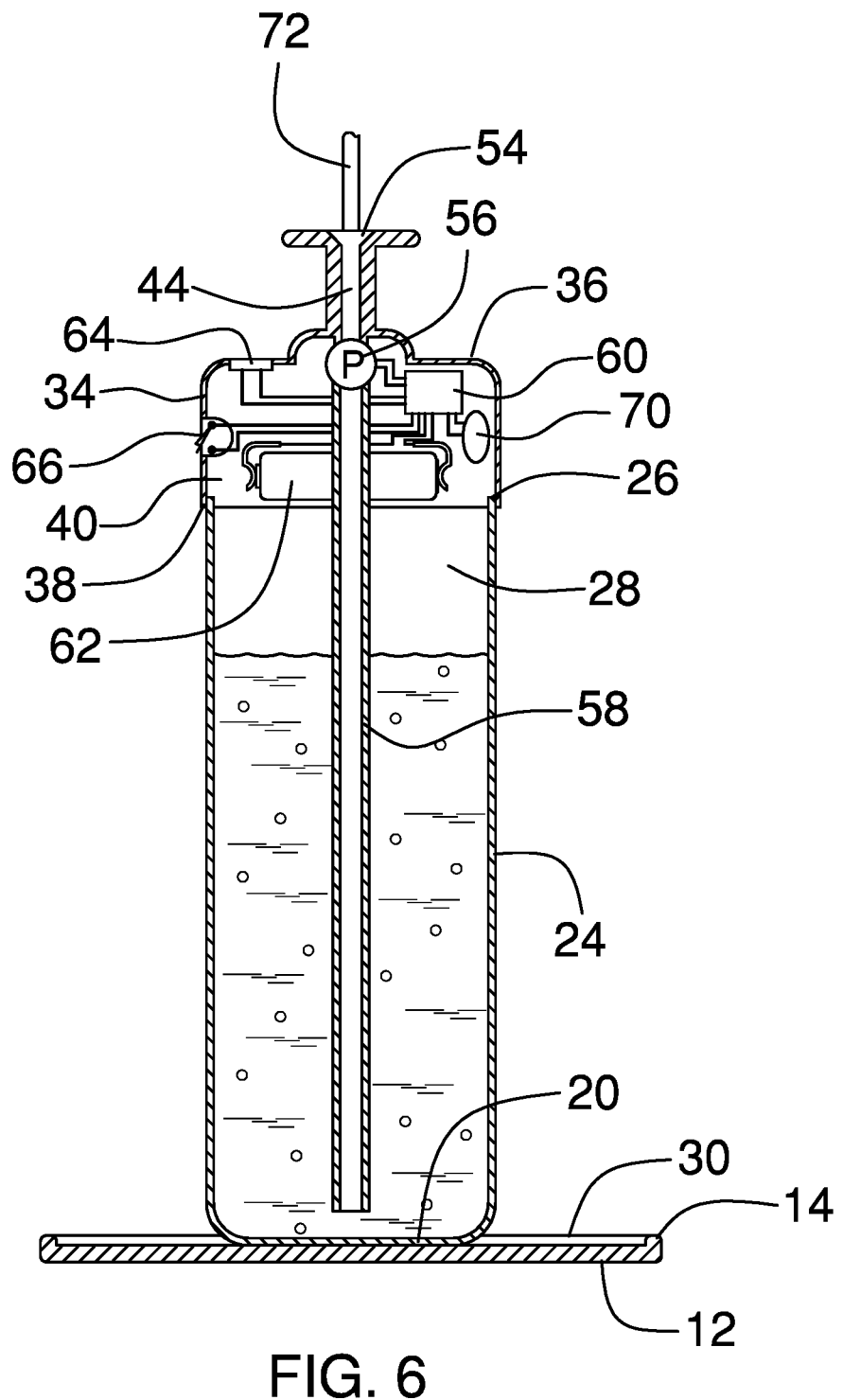
FIG. 6 is a cross section view along the line 6-6 of an embodiment of the disclosure.
Figure 7:
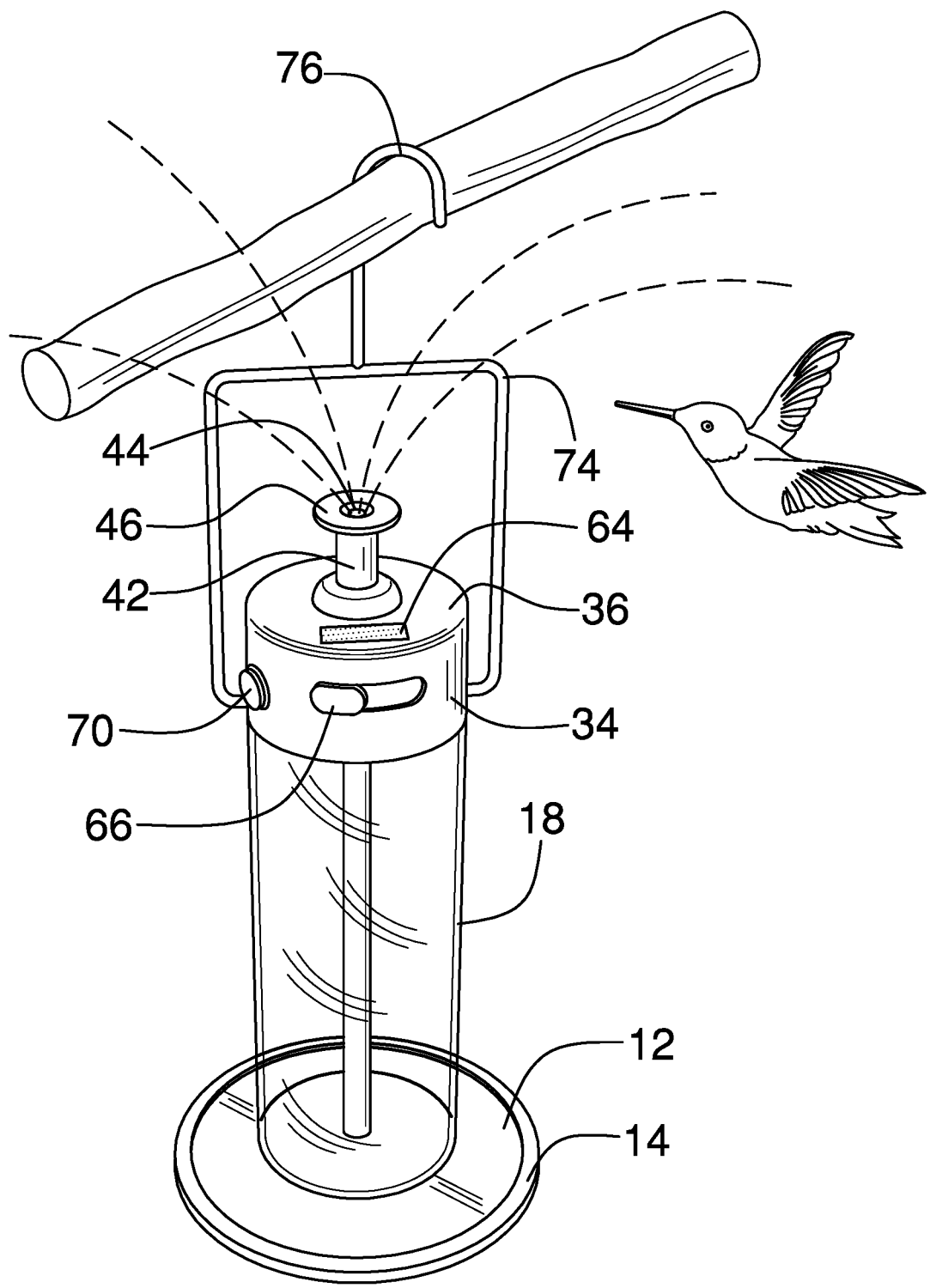
FIG. 7 is an in-use view of an embodiment of the disclosure.

With reference now to the drawings, and in particular to FIGS. 1 through 7 thereof, a new bird watching accessory embodying the principles and concepts of an embodiment of the disclosure and generally designated by the reference numeral 10 will be described.

As best illustrated in FIGS. 1 through 7, the bird mister apparatus 10 generally comprises a circular base plate 12 and having a base lip 14 extending around an outer perimeter 16 thereof. A reservoir 18 is coupled to the base plate 12 and has a reservoir bottom side 20 coupled to a base plate top side 22. A cylindrical reservoir sidewall 24 and an open reservoir top side 26 define a storage cavity 28 configured to hold a liquid. The base plate 12 has a diameter greater than a diameter of the reservoir 18. The base lip 14, the base plate top side 22, and the reservoir sidewall 24 define a trough 30. The trough 30 may hold sweet liquid or bird feed to attract hummingbirds.

A housing 32 that has a housing sidewall 34 extending between a housing top side 36 and a housing bottom side 38 to define a housing inside 40 is coupled to the trough 30. The housing bottom side 38 and the housing sidewall 34 are selectively engageable with the reservoir top side 36 to seal and alternatively unseal the storage cavity 28. A spout 42 is coupled to the housing top side 36 and has a spout aperture 44 extending from a spout top side 46 through to the housing inside 40. The spout 42 comprises a flared spout base 48, a spout shaft 50, and a spout top 52. The spout base 48 and the spout top 52 are wider than the spout shaft 50. The spout top 52 is disc shaped and the spout top side 46 has a conical cutout 54 extending through the spout top 52 around the spout aperture 44. The cutout 54 creates a mist with the liquid fed from a pump 56 through the spout aperture 44. The pump is coupled within the housing inside 40 and is in fluid communication with the spout aperture 44. An inlet tube 58 is coupled to the pump 56 and extends through a tube aperture 58 of the housing bottom side 38 to proximal the reservoir bottom side 20. The inlet tube 58 is in fluid communication with the pump 56. A CPU 60 is coupled within the housing inside 40 and is in operational communication with the pump 56. A battery 62 is coupled within the housing inside 40 and is in operational communication with the CPU 60 and the pump 56. A solar panel 64 is coupled to the housing top side 36 and is in operational communication with the battery 62. A power switch 66 is coupled to the housing sidewall 34. The power switch 66 is a slider switch and extends through a switch channel 68 of the housing sidewall 34. The power switch 66 is in operational communication with the CPU 60 to activate and alternatively deactivate the pump 56. A motion sensor 70 is coupled to the housing sidewall 34 and is in operational communication with the CPU 60 to selectively activate the pump 56 when movement is detected. A hanger 72 is coupled to the housing 32 and has a rectangular frame portion 74 coupled to the housing 32 and a hook portion 76 coupled to the frame portion 74. The frame portion 74 has rounded corners and the hook portion 76 lies in a plane perpendicular to a plane of the frame portion 74. The hook portion 76 is configured to support the apparatus 10 on a tree branch, a fence, or an awning to allow hummingbirds to be misted while eating.

In use, the bird mister apparatus 10 is hung to a tree branch, a fence, or an awning with the hook portion 76 to allow birds to feed and receive a mist shower.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A bird mister apparatus comprising:
   a base plate;
   a reservoir coupled to the base plate, the reservoir having a reservoir bottom side coupled to a base plate top side, a cylindrical reservoir sidewall, and an open reservoir top side defining a storage cavity configured to hold a liquid;
   a housing coupled to the reservoir, the housing having a housing sidewall extending between a housing top side and a housing bottom side to define a housing inside, the housing bottom side and the housing sidewall being selectively engageable with the reservoir top side to seal and alternatively unseal the storage cavity;
   a spout coupled to the housing, the spout being coupled to the housing top side and having a spout aperture extending from a spout top side through to the housing inside;
   a pump coupled to the housing, the pump being coupled within the housing inside and in fluid communication with the spout aperture;
   an inlet tube coupled to the pump, the inlet tube extending through a tube aperture of the housing bottom side to proximal the reservoir bottom side, the inlet tube being in fluid communication with the pump;
   a CPU coupled to the housing, the CPU being coupled within the housing inside and being in operational communication with the pump;
   a battery coupled to the housing, the battery being coupled within the housing inside, the battery being in operational communication with the CPU and the pump;
   a power switch coupled to the housing, the power switch being coupled to the housing sidewall, the power switch being in operational communication with the CPU to activate and alternatively deactivate the pump; and
   a hanger coupled to the housing, the hanger being configured to support the apparatus on a tree branch, a fence, or an awning.

2. The bird mister apparatus of claim 1 further comprising a motion sensor coupled to the housing, the motion sensor being coupled to the housing sidewall and being in operational communication with the CPU.

3. The bird mister apparatus of claim 1 further comprising a solar panel coupled to the housing, the solar panel being coupled to the housing top side and being in operational communication with the battery.

4. The bird mister apparatus of claim 1 further comprising the base plate being circular and having a diameter greater than a diameter of the reservoir, the base having a base lip extending around an outer perimeter thereof, the base lip, the base top side, and the reservoir sidewall defining a trough.

5. The bird mister apparatus of claim 1 further comprising the spout comprising a flared spout base, a spout shaft, and a spout top, the spout base and the spout top being wider than the spout shaft.

6. The bird mister apparatus of claim 5 further comprising the spout top being disc shaped, the spout top side having a conical cutout extending through the spout top around the spout aperture, the cutout creating a mist with the liquid fed from the pump through the spout aperture.

7. The bird mister apparatus of claim 1 further comprising the hanger having a rectangular frame portion coupled to the housing and a hook portion coupled to the frame portion.

8. The bird mister apparatus of claim 7 further comprising the hook portion lying in a plane perpendicular to a plane of the frame portion.

9. The bird mister apparatus of claim 7 further comprising the frame portion having rounded corners.

10. The bird mister apparatus of claim 1 further comprising the power switch being a slider switch, the slider switch extending through a switch channel of the housing sidewall.

11. A bird mister apparatus comprising:
a base plate, the base plate being circular and having a base lip extending around an outer perimeter thereof;
a reservoir coupled to the base plate, the reservoir having a reservoir bottom side coupled to a base plate top side, a cylindrical reservoir sidewall, and an open reservoir top side defining a storage cavity configured to hold a liquid, the base plate having a diameter greater than a diameter of the reservoir, the base lip, the base top side, and the reservoir sidewall defining a trough;
a housing coupled to the reservoir, the housing having a housing sidewall extending between a housing top side and a housing bottom side to define a housing inside, the housing bottom side and the housing sidewall being selectively engageable with the reservoir top side to seal and alternatively unseal the storage cavity;
a spout coupled to the housing, the spout being coupled to the housing top side and having a spout aperture extending from a spout top side through to the housing inside, the spout comprising a flared spout base, a spout shaft, and a spout top, the spout base and the spout top being wider than the spout shaft, the spout top being disc shaped, the spout top side having a conical cutout extending through the spout top around the spout aperture;
a pump coupled to the housing, the pump being coupled within the housing inside and in fluid communication with the spout aperture;
an inlet tube coupled to the pump, the inlet tube extending through a tube aperture of the housing bottom side to proximal the reservoir bottom side, the inlet tube being in fluid communication with the pump, the cutout creating a mist with the liquid fed from the pump through the spout aperture;
a CPU coupled to the housing, the CPU being coupled within the housing inside and being in operational communication with the pump;
a battery coupled to the housing, the battery being coupled within the housing inside, the battery being in operational communication with the CPU and the pump;
a solar panel coupled to the housing, the solar panel being coupled to the housing top side and being in operational communication with the battery;
a power switch coupled to the housing, the power switch being coupled to the housing sidewall, the power switch being a slider switch, the slider switch extending through a switch channel of the housing sidewall, the power switch being in operational communication with the CPU to activate and alternatively deactivate the pump;
a motion sensor coupled to the housing, the motion sensor being coupled to the housing sidewall and being in operational communication with the CPU; and
a hanger coupled to the housing, the hanger having a rectangular frame portion coupled to the housing and a hook portion coupled to the frame portion, the frame portion having rounded corners, the hook portion lying in a plane perpendicular to a plane of the frame portion, the hook portion being configured to support the apparatus on a tree branch, a fence, or an awning.

* * * * *